(12) United States Patent
Morey

(10) Patent No.: US 6,722,596 B1
(45) Date of Patent: Apr. 20, 2004

(54) MULTIPLE WHEEL FEED WHEEL ASSEMBLY FOR A WOOD CHIPPER

(75) Inventor: Michael Boyd Morey, Shepherd, MI (US)

(73) Assignee: Tramor, Inc., Remus, MI (US)

( * ) Notice: Subject to any disclaimer, the term of this patent is extended or adjusted under 35 U.S.C. 154(b) by 0 days.

(21) Appl. No.: 09/845,982

(22) Filed: Apr. 30, 2001

Related U.S. Application Data

(60) Provisional application No. 60/265,527, filed on Jan. 31, 2001.

(51) Int. Cl.$^7$ .............................................. B02C 18/22
(52) U.S. Cl. ...................... 241/92; 241/225; 241/285.2
(58) Field of Search ....................... 241/92, 225, 285.2; 144/176

(56) References Cited

U.S. PATENT DOCUMENTS

| | | | |
|---|---|---|---|
| 821,447 A | * | 5/1906 | Albrecht ...................... 241/225 |
| 3,069,101 A | | 12/1962 | Wexell |
| 3,076,489 A | | 2/1963 | Schmidt et al. |
| 3,182,917 A | | 5/1965 | Tamny et al. |
| 3,276,700 A | | 10/1966 | Eklund |
| 3,463,405 A | | 8/1969 | Shepherd |
| 3,559,724 A | | 2/1971 | Wilkinson |
| 3,635,410 A | | 1/1972 | Smith |
| 3,868,062 A | | 2/1975 | Cunningham et al. |
| 3,939,886 A | | 2/1976 | Tucek |
| 3,989,198 A | | 11/1976 | Blasko |
| 4,022,021 A | | 5/1977 | Russell, Jr. |
| 4,260,114 A | | 4/1981 | Herder |
| 4,452,400 A | | 6/1984 | Williams |
| 4,560,110 A | | 12/1985 | Burda |
| 4,685,624 A | | 8/1987 | Nidiffer et al. |
| 4,687,179 A | | 8/1987 | Smith |
| 4,692,028 A | | 9/1987 | Schave |
| 4,716,823 A | | 1/1988 | Capdevila |
| 4,721,257 A | | 1/1988 | Williams et al. |
| 4,793,561 A | | 12/1988 | Burda |
| 4,906,486 A | | 3/1990 | Young |
| 5,005,620 A | | 4/1991 | Morey |
| 5,018,672 A | | 5/1991 | Peck et al. |
| 5,088,532 A | | 2/1992 | Eggers et al. |
| RE33,840 E | | 3/1992 | Peterson et al. |
| 5,167,374 A | | 12/1992 | Strohmeyer |
| 5,263,651 A | | 11/1993 | Nadarajah |
| 5,358,189 A | | 10/1994 | Vandermolen |
| 5,362,004 A | | 11/1994 | Bateman |
| 5,372,316 A | | 12/1994 | Bateman |
| 5,413,286 A | | 5/1995 | Bateman |
| 5,667,152 A | | 9/1997 | Mooring |
| 5,988,539 A | | 11/1999 | Morey |
| 6,000,642 A | | 12/1999 | Morey |
| 6,016,855 A | | 1/2000 | Morey |
| 6,032,707 A | | 3/2000 | Morey et al. |
| 6,357,684 B1 | * | 3/2002 | Morey ......................... 241/301 |

FOREIGN PATENT DOCUMENTS

| | | |
|---|---|---|
| DE | 36 24 996 A1 | 2/1988 |
| DE | 38 08 487 C1 | 5/1989 |

\* cited by examiner

*Primary Examiner*—Mark Rosenbaum
(74) *Attorney, Agent, or Firm*—Bliss McGlynn, P.C.

(57) ABSTRACT

A multiple wheel feed wheel assembly for wood chipper includes an infeed chute and a rotatable cutting assembly spaced from the infeed chute. The multiple wheel feed wheel assembly also includes a first feed wheel disposed between the infeed chute and the cutting assembly. The multiple wheel feed wheel assembly further includes a second feed wheel spaced longitudinally between the first feed wheel and the infeed chute to feed wood material to the first feed wheel.

17 Claims, 6 Drawing Sheets

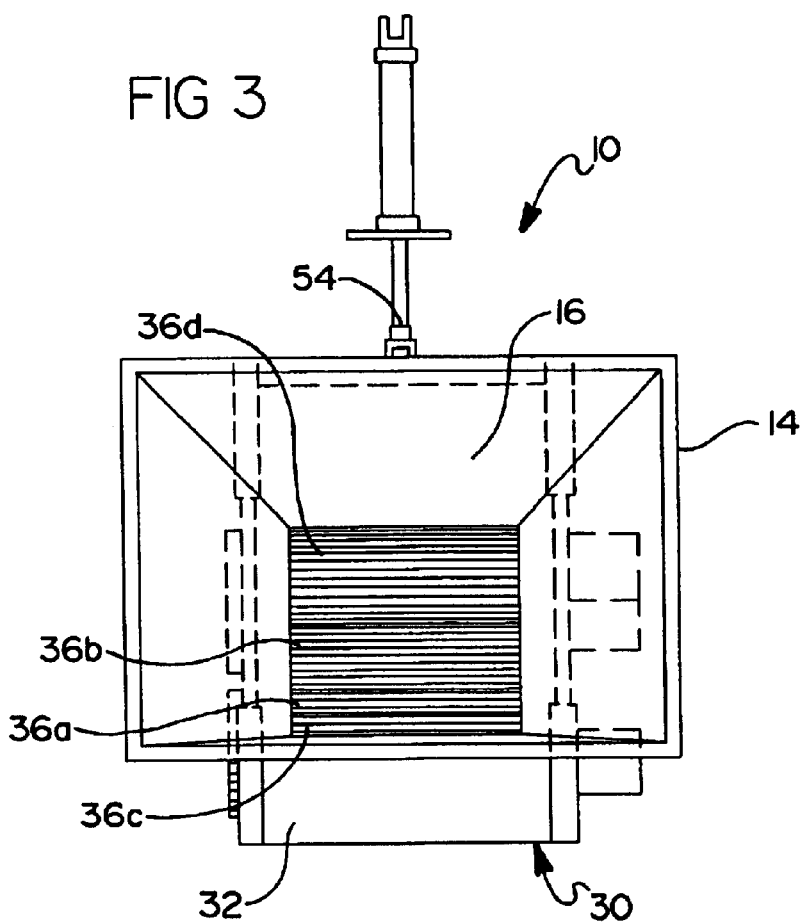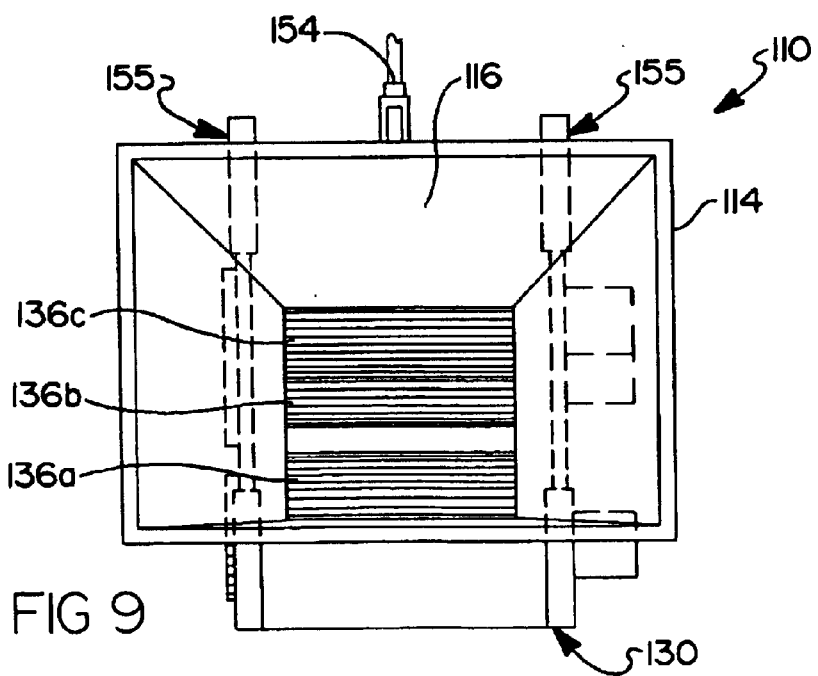

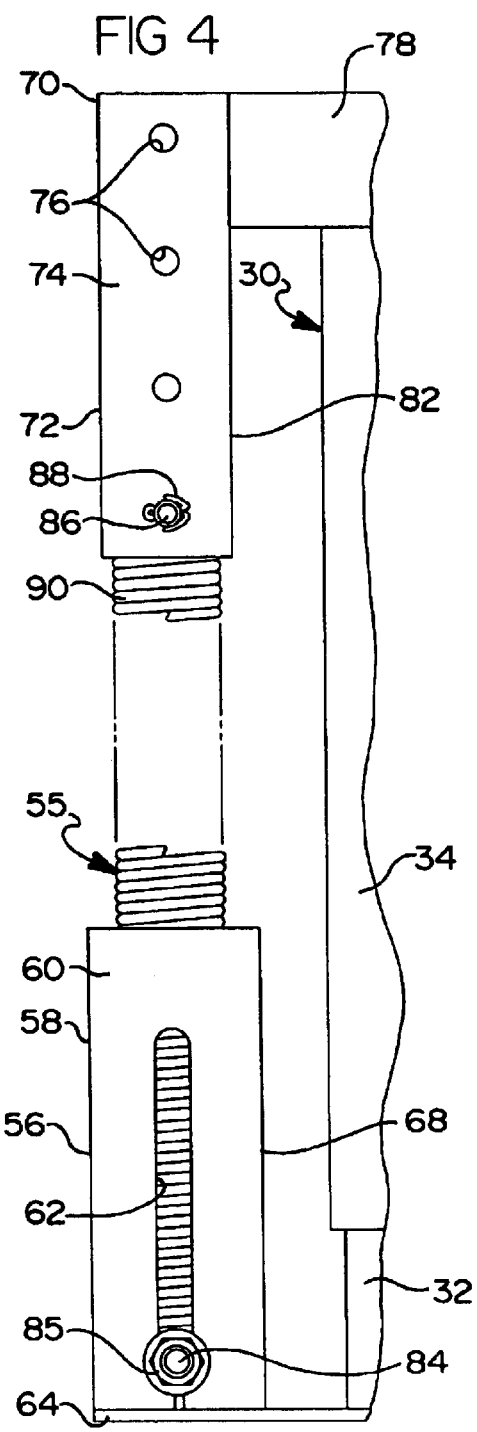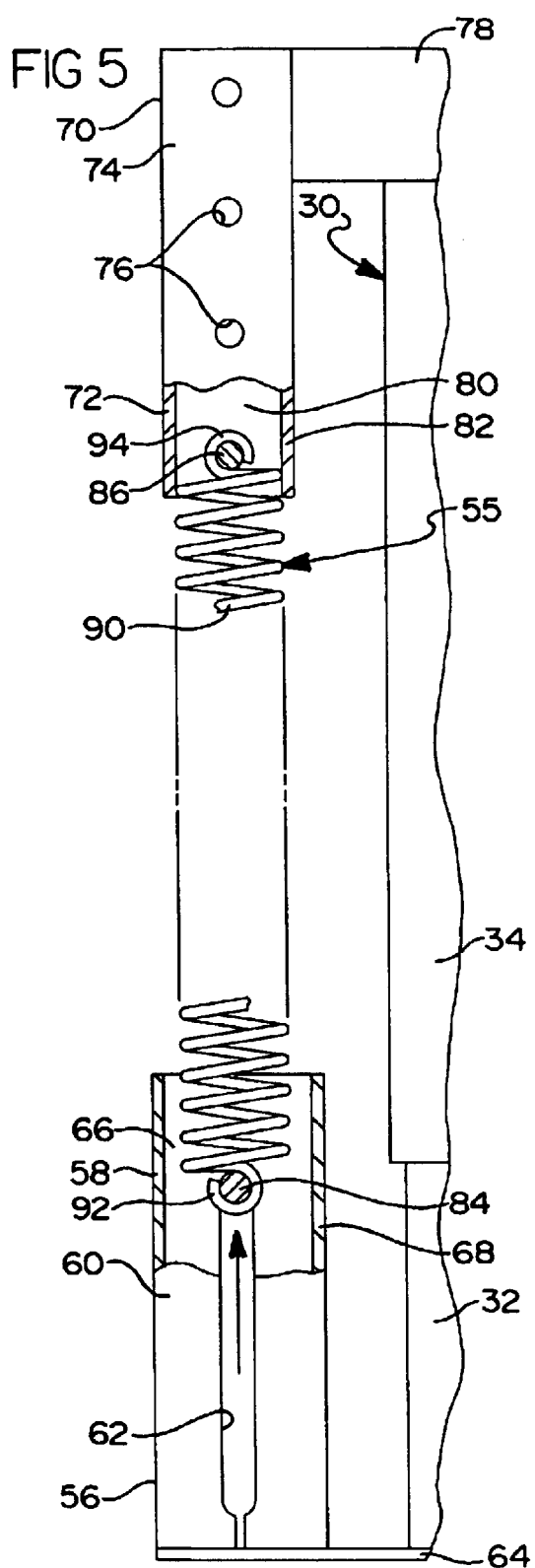

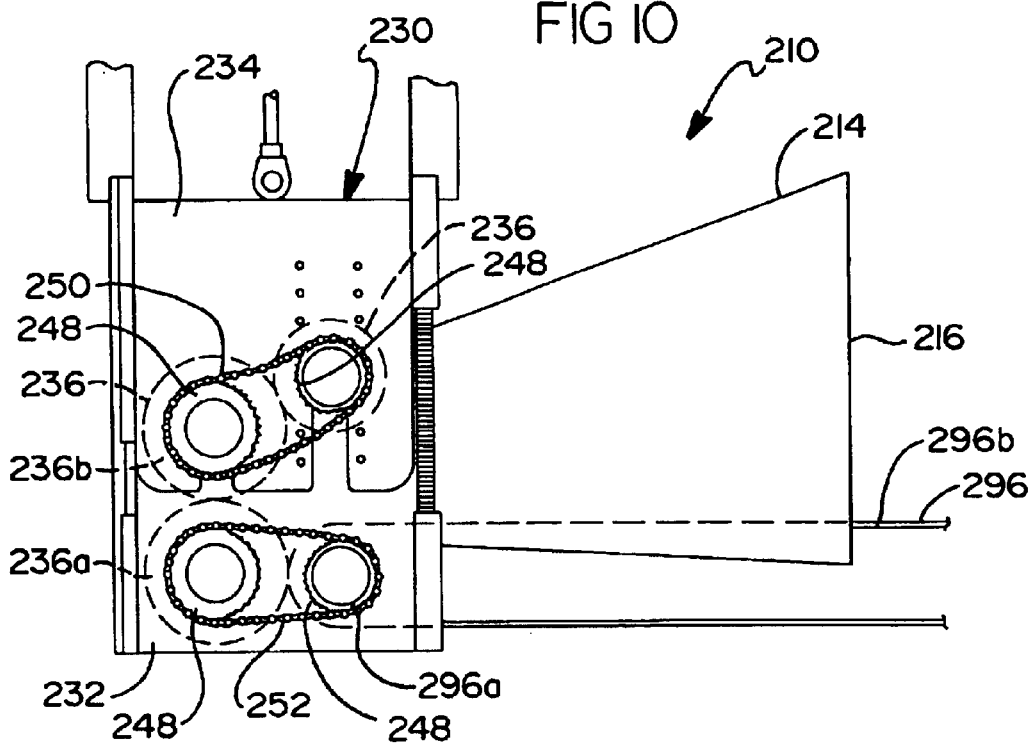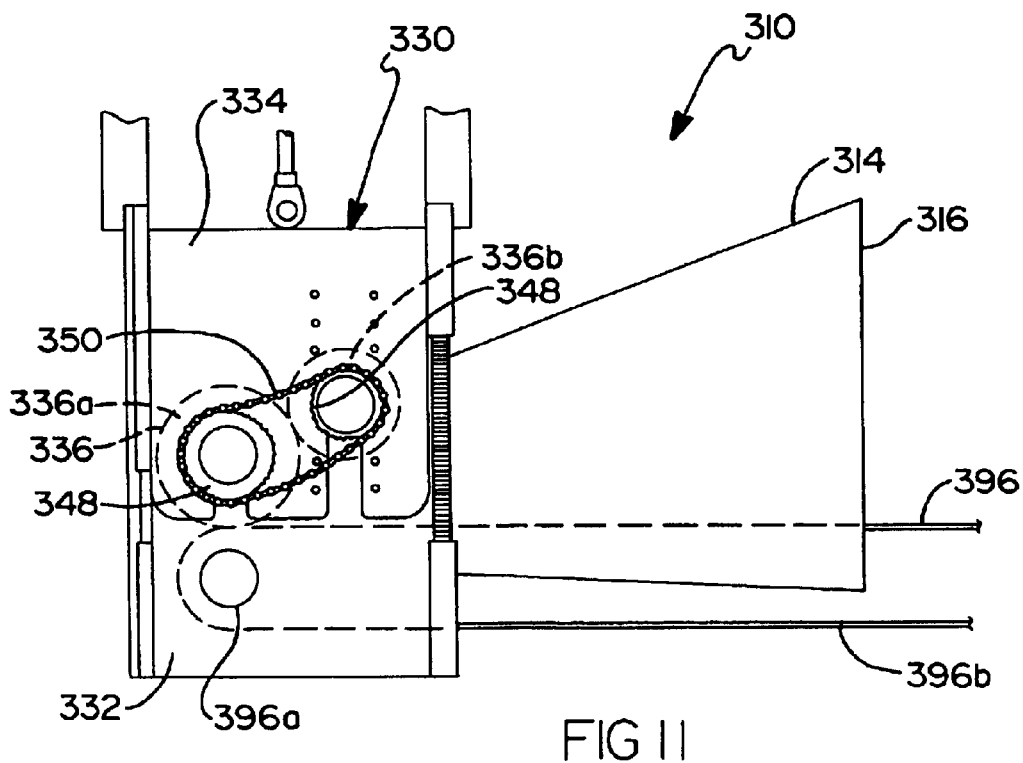

MULTIPLE WHEEL FEED WHEEL ASSEMBLY FOR A WOOD CHIPPER

CROSS-REFERENCE TO RELATED APPLICATION(S)

The present invention claims the priority date of U.S. Provisional Patent Application Serial No. 60/265, 527, filed Jan. 31, 2001.

BACKGROUND OF THE INVENTION

1. Field of the Invention

The present invention relates generally to wood chippers and, more particularly, to a multiple wheel feed wheel assembly for a wood chipper.

2. Description of the Related Art

It is known to provide a wood chipper for chipping wood such as brush, branches, and the like to produce wood chips. An example of such a wood chipper is disclosed in U.S. Pat. No. 5, 988, 539 to Morey. In this patent, the wood chipper includes an infeed chute, feed wheel assembly, and a cutting assembly having a rotatable disc with at least one knife or blade for chipping the wood entering the wood chipper and reducing it to wood chips. Typically, the feed wheel assembly includes a feed system having a stationary lower feed wheel connected to a lower housing and a movable upper feed wheel connected to an upper housing movable relative to the lower housing for allowing wood to enter the cutting assembly. The feed wheel assembly also includes a spring interconnecting the upper housing and the lower housing to urge the upper feed wheel toward the lower feed wheel to apply a spring force against the wood entering between the feed wheels to feed the wood to the cutting assembly.

Although this type of feed wheel assembly has worked well, it is desirable to reduce a pinch point between the upper feed wheel and the lower feed wheel. It is also desirable to provide a feed wheel assembly to allow larger diameter wood to enter the wood chipper virtually effortlessly by an operator without moving a hydraulic lift. It is further desirable to provide a feed wheel assembly for a wood chipper, which increases the distance between the pinch point and the operator and reduces a kick up of the wood material when fed in by an operator under normal or extreme operating conditions. Therefore, there is a need in the art to provide a multiple wheel feed wheel assembly for a wood chipper to that meets these desires.

SUMMARY OF THE INVENTION

Accordingly, the present invention is a multiple wheel feed wheel assembly for a wood chipper including an infeed chute and a rotatable cutting assembly spaced from the infeed chute. The multiple wheel feed wheel assembly also includes a first feed wheel disposed between the infeed chute and the cutting assembly. The multiple wheel feed wheel assembly further includes a second feed wheel spaced longitudinally between the first feed wheel and the infeed chute to feed wood material to the first feed wheel.

One advantage of the present invention is that a new and multiple wheel feed wheel assembly is provided for a wood chipper. Another advantage of the present invention is that the multiple wheel feed wheel assembly is provided that has four feed wheels positioned horizontally and spaced vertically with a forward pair of feed wheels located in front of a rear pair of feed wheels to move the pinch point further away from the operator. A further advantage of the present invention is that the multiple wheel feed wheel assembly has allows the forward upper feed wheel to be spaced a predetermined distance from a forward lower feed wheel to allow large diameter wood material to be fed virtually effortlessly in feeding wood to the cutting assembly by an operator and to reduce the tendency of the wood material to kick upwardly.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 3 is a front elevational view of the multiple wheel feed wheel assembly of FIG. 1.

FIG. 4 is an enlarged fragmentary elevational view of a portion of the multiple wheel feed wheel assembly of FIG. 1 illustrating a first operative position.

FIG. 5 is a view similar to FIG. 4 of the portion of the multiple wheel feed wheel assembly illustrating a second operative position.

FIG. 9 is a front elevational view of the multiple wheel feed wheel assembly of FIG. 8.

FIG. 10 is a side elevational view of yet another embodiment, according to the present invention, of the multiple wheel feed wheel assembly of FIG. 1.

FIG. 11 is a side elevational view of still another embodiment, according to the present invention, of the multiple wheel feed wheel assembly of FIG. 1.

DESCRIPTION OF THE PREFERRED EMBODIMENT(S)

Figure 1:
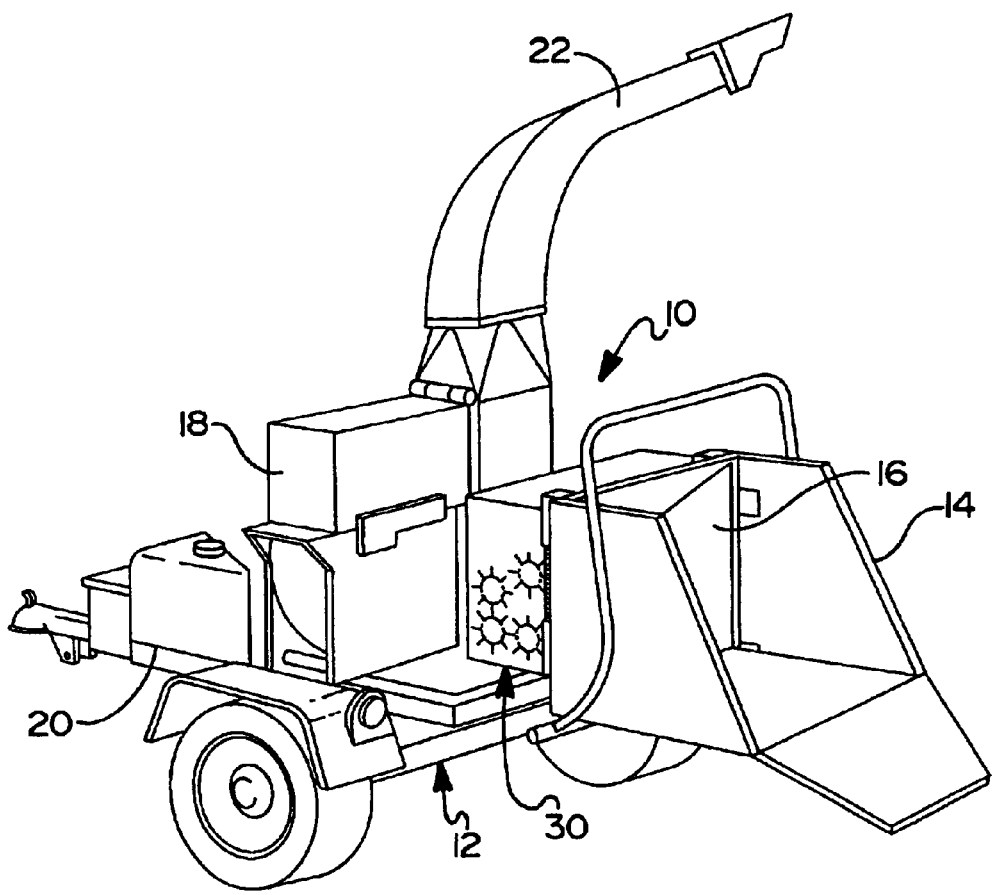
FIG. 1 is a perspective view of a multiple wheel feed wheel assembly, according to the present invention, illustrated in operational relationship with a wood chipper.
Figure 2:
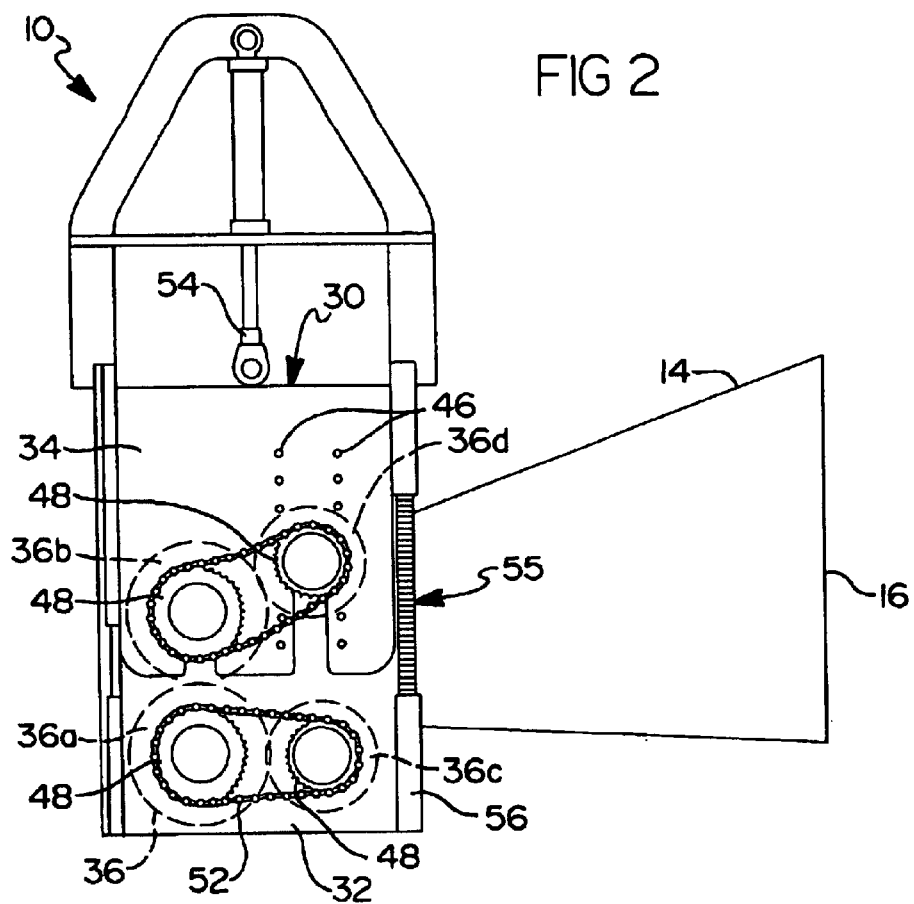
FIG. 2 is a side elevational view of the multiple wheel feed wheel assembly of FIG. 1.

Referring now to the drawings and in particular FIGS. 1 and 2, one embodiment of a multiple wheel feed wheel assembly 10, according to the present invention, is shown for a wood chipper, generally indicated at 12. The wood chipper 12 includes an infeed chute assembly 14 having an inlet 16 to allow wood material to enter the wood chipper 12. The wood chipper 12 also includes the multiple wheel feed wheel assembly 10 disposed between and adjacent to the infeed chute assembly 14 and a cutting assembly 18 for rotation about a horizontal axis adjacent to the multiple wheel feed wheel assembly 10. The multiple wheel feed wheel assembly 10 is used for pulling and pushing the wood material from the infeed chute assembly 14 to the cutting assembly 18. The cutting assembly 18 includes a rotatable disc (not shown) having a plurality of blades (not shown) operatively connected to the disc for chipping the wood material. It should be appreciated that, except for the multiple wheel feed wheel assembly 10, the wood chipper 12 is conventional and known in the art.

The wood chipper 12 includes an engine (not shown) mounted on a frame 20 and coupled to the multiple wheel feed wheel assembly 10 and cutting assembly 18 by suitable means to cause rotation of the feed wheels to be described and disc. The wood chipper 12 includes a rotatable shaft (not shown) operatively connected to the disc of the cutting assembly 18 and a pulley (not shown) disposed about one end of the shaft. The wood chipper 12 also includes a rotatable shaft (not shown) operatively connected to the engine and a pulley (not shown) disposed about the shaft (not shown). The wood chipper 12 further includes a belt or belts (not shown) disposed over and interconnecting the pulleys. It should be appreciated that the engine rotates cutting assembly 18 and a pump (not shown) to pump hydraulic fluid to rotate feed wheels to be described of the multiple wheel tension feed wheel assembly 10.

The wood chipper 12 includes an outlet or discharge chute 22 operatively connected to the cutting assembly 18. The discharge chute 22 is generally tubular and may be circular or rectangular in cross-sectional shape. The discharge chute 22 extends upwardly and away. It should be appreciated that the discharge chute 22 may have any suitable cross-sectional shape.

Referring to FIGS. 1 through 5, the multiple wheel feed wheel assembly 10 includes a housing, generally indicated at 30. The housing 30 includes a first or lower housing 32 having a generally rectangular shape. The lower housing 32 is stationary and connected to the cutting assembly 18 by suitable means such as welding. The lower housing 32 has an inlet (not shown) on one side to receive wood material from the infeed chute assembly 14 and an outlet (not shown) on the other side to discharge wood material to the cutting assembly 18. It should also be appreciated that the lower housing 32 may have any suitable cross-sectional shape.

The housing 30 also includes a movable second or upper housing 34 disposed over the lower housing 32 and slidable relative to the lower housing 32. The upper housing 34 is generally rectangular in shape with a generally inverted U shape cross-section to enclose or cover the lower housing 32. The upper housing 34 has an inlet (not shown) on one side to receive wood material from the infeed chute assembly 14 and an outlet (not shown) on the other side to discharge wood material to the cutting assembly 18. It should be appreciated that the upper housing 34 may have any suitable cross-sectional shape.

The multiple wheel feed wheel assembly 10 also includes a multiple or plurality of rotatable feed wheels 36 disposed in the housing 30. In a preferred embodiment, the feed wheels 36 are four feed wheels 36a, 36b, 36c, and 36d. Preferably, the feed wheels 36a through 36d are orientated horizontally to rotate about a horizontal axis. The feed wheels 36a and 36c are lower feed wheels, which are supported by the lower housing 32. The feed wheels 36b and 36d are upper feed wheels, which are supported by the upper housing 34. The lower feed wheel 32a and upper feed wheel 32b form a rear pair of the feed wheels 36 and the upper feed wheel 36b is spaced vertically from the lower feed wheel 36a. The lower feed wheel 36c and upper feed wheel 36d form a forward pair of the feed wheels 36 and are spaced longitudinally between the rear pair of feed wheels 36 and the infeed chute assembly 14 and are offset vertically from the rear feed wheel 36. The upper feed wheel 36d is spaced vertically from the lower feed wheel 36c a distance greater than the upper feed wheel 36b is spaced vertically from the lower feed wheel 36a. The lower feed wheel 36c is spaced vertically from the upper feed wheel 36b a distance greater than the lower feed wheel 36a is spaced vertically from the upper feed wheel 36b. The lower feed wheels 36 are rotatably supported on the lower housing 32 by a pair of opposed bearings 38. The bearings 38 are secured to the lower housing 32 by suitable means such as fasteners 40. It should be appreciated that the forward feed wheels 36 are spaced vertically a distance greater than the rear feed wheels 36 to form a generally "V" shape configuration. It should also be appreciated that the lower feed wheels 36 are disposed within the lower housing 32 and supported by the bearings 38 to rotate relative to the housing 30.

The upper feed wheels 36 are rotatably supported on the upper housing 34 by a pair of opposed bearings 42. The bearings 42 are secured to the upper housing 34 by suitable means such as fasteners 44. Optionally, the bearing 42 for the forward upper feed wheel 36d may be adjusted vertically by a plurality of apertures 46 spaced vertically to allow the bearing 42 to be moved and secured in place to vary the distance between forward upper feed wheel 36d and the forward lower feed wheel 36c. It should be appreciated that the upper feed wheels 36 are disposed within the upper housing 34 and supported by the bearings 42 to rotate relative to the housing 30.

The multiple wheel feed wheel assembly 10 includes a sprocket 48 on one end of the feed wheels 36 and disposed outside of the housing 30. The multiple wheel feed wheel assembly 10 includes a lower chain 52 disposed about the sprockets 48 of the lower feed wheels 36a and 36c to rotatably connect the lower feed wheels 36a and 36c together. The multiple wheel feed wheel assembly 10 includes an upper chain 50 disposed about the sprockets 48 of the upper feed wheels 36b and 36d to rotatably connect the upper feed wheels 36b and 36d together. It should also be appreciated that the other end of the rear feed wheels 36a and 36b are operatively connected to the engine of the wood chipper 12 by suitable means such as the hydraulic pump (not shown) which pumps fluid to drive hydraulic motors (not shown) to rotate the rear feed wheels 36a and 36b which in turn rotate or drive the forward feed wheels 36c and 36d via the chains 50 and 52. It should be appreciated that the wood chipper 12 may have a hydraulic yoke 54 connected to the hydraulic pump and the upper housing 34 to allow an operator to slidably raise and lower the upper housing 34 relative to the lower housing 32. It should also be appreciated that, in other embodiments, feed wheels 36 may be located horizontally, vertically, or diagonally for the multiple wheel feed wheel assembly 10.

Referring to FIGS. 2 through 5, the multiple wheel feed wheel assembly 10 includes a spring assembly, generally indicated at 55 to urge the upper housing 34 toward the lower housing 32. The spring assembly includes a first or lower member 56 connected to the lower housing 32. The lower member 56 has a generally tubular or U-shaped cross-sectional shape. The lower adjustment member 56 has a base wall 58 and a pair of opposed side walls 60 extending generally perpendicular to the base wall 58. Each of the side walls 60 may include a slot 62 extending therethrough and axially therealong for a function to be described. The lower member 56 is secured to a lower plate member 64 by suitable means such as welding. The lower plate member 64 is secured to the lower housing 32 by suitable means such as welding. It should be appreciated that the lower member 56 has a channel 66 therein for a function to be described. It should also be appreciated that the lower member 46 may include a separate wall 68 opposing the base wall 58 or a wall of the lower housing 32.

The spring assembly 55 also includes a second or upper member 70 connected to the upper housing 34. The upper member 70 has a generally tubular or U-shaped cross-sectional shape. The upper member 70 has a base wall 72 and a pair of opposed side walls 74 extending generally perpendicular to the base wall 72. Each of the side walls 74 includes a plurality of apertures 76 extending therethrough and spaced axially therealong for a function to be described. The upper member 70 is secured to an upper plate member 78 by suitable means such as welding. The upper plate member 78 is secured to the upper housing 34 by suitable means such as welding. It should be appreciated that the upper member 70 has a channel 80 therein for a function to be described. It should also be appreciated that the upper member 70 may include a separate wall 82 opposing the base wall 72 or a wall of the upper housing 34.

The spring assembly 55 includes a first or lower fastener 84 extending through the slots 62 in the lower adjustment member 56 and may be slideable therealong. The first fastener 84 may be of a bolt type extending through the slots 62 and secured by a nut 85 to prevent the first fastener 84 from exiting the slots 62. The spring assembly 55 also includes a second or upper fastener 86 extending through one of the opposed pairs of apertures 76 in the upper member 70. The second fastener 86 may be of a pin type extending through the opposed apertures 76 and secured by a cotter key 88 on both ends to prevent second fastener 86 from exiting the apertures 76. The spring assembly 55 further includes a spring 90 to urge the lower housing 32 and upper housing 34 together and the upper feed wheels 36*b* and 36*d* and lower feed wheels 36*a* and 36*c* together in the closed position. The spring 90 is of a coil type having a first or lower end 92 disposed in the channel 66 of the first member 56. The first end 92 is disposed about and connected to the first fastener 84. The spring 90 has a second or upper end 94 disposed in the channel 80 of the upper member 70. The second end 94 is disposed about and connected to the second fastener 86. It should be appreciated that the spring 90 is in a normal or retracted position and the first end 92 may move with the first fastener 84 relative to the lower adjustment member 56.

In operation of the wood chipper 12, the engine rotates the cutting assembly 18 and hydraulically rotates the rear feed wheels 36*a* and 36*b* of the multiple wheel feed wheel assembly 10. Wood is fed into the inlet 16 of the infeed chute assembly 14 by an operator and is contacted by the forward feed wheels 36*c* and 36*d* and fed to the rear feed wheels 36*a* and 36*b* since the forward feed wheels 36*c* and 36d are driven by the rear feed wheels 36*a* and 36*b* via the chains 50 and 52. The wood is fed by the rear feed wheels 36*a* and 36*b* to the cutting assembly 18. As the cutting assembly 18 rotates and contacts the wood, the wood is cut or chipped into wood chips, which move through the outlet of the cutting assembly 18 and are expelled out of the discharge chute 22. It should be appreciated that the space between the forward upper feed wheel 36*d* and forward lower feed wheel 36*c* allows larger diameter wood to be fed into the multiple wheel feed wheel assembly 10 without much effort before contacting the rear feed wheels 36*a* and 36*b*, allows the wood to be pulled out if necessary, and provides a greater longitudinal distance between the operator and the rear feed wheels 36*a* and 36*b*.

In operation of the spring assembly 55, the wood fed into the inlet 16 contacts the forward upper feed wheel 36*d* which is allowed to move upwardly only against the force of gravity for the distance or length of the predetermined slots 62. The first end 92 of the spring 90 moves with the first fastener 84 as the first fastener 84 moves along the slots 62 to delay the tension applied by the spring 90. Once the first fastener 84 reaches or contacts the upper end of the slots 62, the first fastener 84 is stopped or fixed relative to the first member 56. If the upper feed wheel 36*d* is moved further upwardly, the spring 90 begins to stretch and applies a tension or spring force to the upper housing 34 and upper feed wheel 36*d* to urge the upper feed wheel 36*d* toward the lower feed wheel 36*c*. It should be appreciated that the tension or spring force of the spring 90 may be adjusted by the placement of the second fastener 86 in another pair of apertures 76 prior to use. It should also be appreciated that the length of slots 62 may be varied to vary the distance before the tension or spring force is applied by the spring 90. It should further be appreciated that once the spring 90 is retracted there is no tension or spring force applied on the upper feed wheel 36*d* but only gravity. It should still further be appreciated that the rear upper feed wheel 36*b* moves with the upper housing 34.

Figure 8:
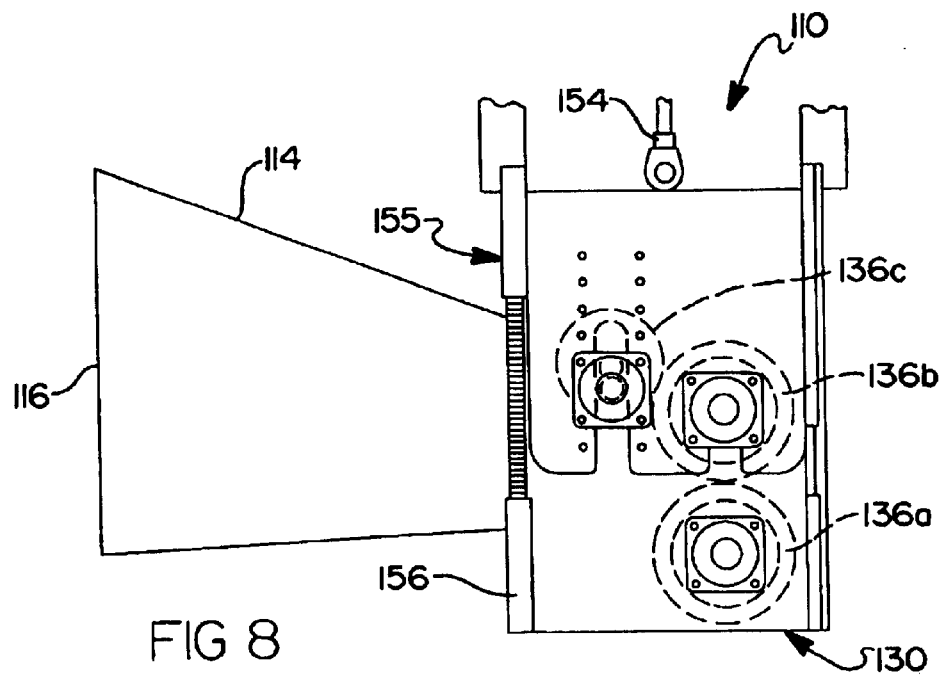
FIG. 8 is a side elevational view of another embodiment, according to the present invention, of the multiple wheel feed wheel assembly of FIG. 1.
Figure 6:
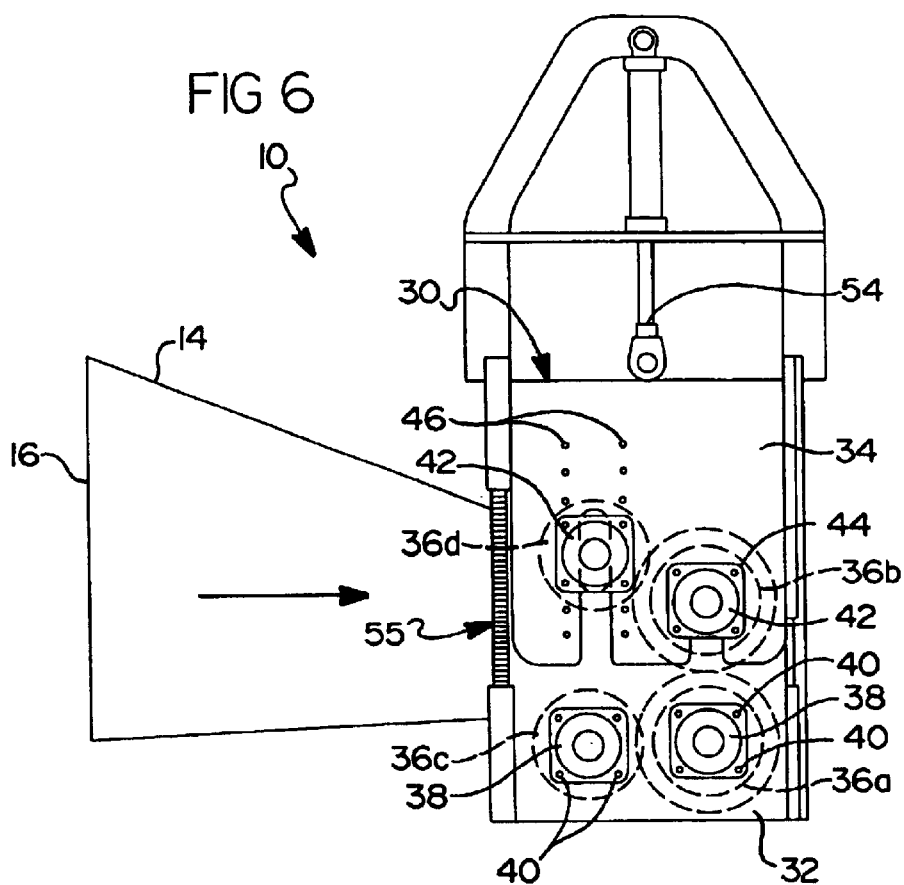
FIG. 6 is an enlarged side elevational view of the multiple wheel feed wheel assembly of FIG. 1 illustrating a first operative position.
Figure 7:
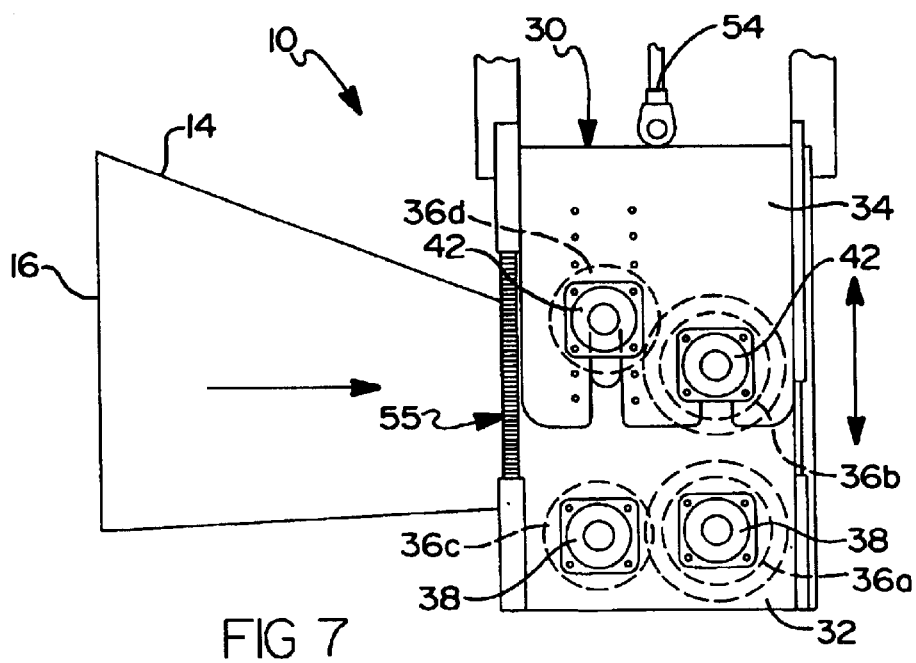
FIG. 7 is a view similar to FIG. 6 of the multiple wheel feed wheel assembly illustrating a second operative position.

Referring to FIGS. 8 and 9, another embodiment, according to the present invention, of the multiple wheel feed wheel assembly 10 is shown. Like parts of the multiple wheel feed wheel assembly 10 has like parts increased by one hundred (100). In this embodiment, the multiple wheel feed wheel assembly 110 includes a multiple or plurality of rotatable feed wheels 136 disposed in the housing 130. In a preferred embodiment, the feed wheels 136 are three feed wheels 136*a*, 136*b*, and 136*c*. Preferably, the feed wheels 136*a* through 136*c* are orientated horizontally to rotate about a horizontal axis. The feed wheel 136*a* is a lower feed wheel, which is supported by the lower housing 132. The feed wheels 136*b* and 136*c* are upper feed wheels, which are supported by the upper housing 134. The lower feed wheel 132*a* and upper feed wheel 132*b* form a rear pair of the feed wheels 136 and the upper feed wheel 136*c* is spaced longitudinally from the upper feed wheel 136*b* and vertically from a bottom of the lower housing 132. The upper feed wheel 136*c* forms a forward feed wheel 136 and is spaced longitudinally between the rear pair of feed wheels 136 and the infeed chute assembly 14 and is offset vertically from the rear upper feed wheel 136*b*. The upper feed wheel 136*c* is spaced vertically from the bottom of the lower housing 132 to form a space or gap at a distance greater than a space or gap of the upper feed wheel 136*b* spaced vertically from the lower feed wheel 136*a*.

In operation of the wood chipper 12, wood is fed into the inlet 16 of the infeed chute assembly 14 by an operator and is contacted by the forward feed wheel 136*c* and fed to the rear feed wheels 136*a* and 136*b* since the forward feed wheel 136*c* is driven by the rear feed wheel 136*b* via a chain (not shown). The wood is fed by the rear feed wheels 136*a* and 136*b* to the cutting assembly 18. As the cutting assembly 18 rotates and contacts the wood, the wood is cut or chipped into wood chips, which move through the outlet of the cutting assembly 18 and are expelled out of the discharge chute 22. It should be appreciated that the space between the forward upper feed wheel 136*c* and the bottom of the lower housing 132 allows larger diameter wood to be fed into the multiple wheel feed wheel assembly 110 without much effort before contacting the rear feed wheels 136*a* and 136*b*, allows the wood to be pulled out if necessary, and provides a greater longitudinal distance between the operator and the rear feed wheels 136*a* and 136*b*.

Referring to FIG. 10, yet another embodiment, according to the present invention, of the multiple wheel feed wheel assembly 10 is shown. Like parts of the multiple wheel feed wheel assembly 10 has like parts increased by two hundred (200). In this embodiment, the multiple wheel feed wheel assembly 210 includes a multiple or plurality of rotatable feed wheels 236 disposed in the housing 230. In a preferred embodiment, the feed wheels 236 are three feed wheels 236a, 236b, and 236c. Preferably, the feed wheels 236a, 236b, and 236d are orientated horizontally to rotate about a horizontal axis. The feed wheel 236a is a lower feed wheel, which is supported by the lower housing 232. The feed wheels 236b and 236c are upper feed wheels, which are supported by the upper housing 234. The multiple wheel feed wheel assembly 210 also includes an infeed conveyor 296 extending through the inlet 216 and into the infeed chute assembly 214. The infeed conveyor 296 has a terminal wheel end 296a spaced longitudinally from the lower feed wheel 236a and spaced vertically from the upper feed wheel 236c. The lower feed wheel 232a and upper feed wheel 232b form a rear pair of the feed wheels 236 and the upper feed wheel 236c is spaced longitudinally from the upper feed wheel 236b and vertically from the terminal wheel end 296a of the infeed conveyor 296. The upper feed wheel 236c forms a forward feed wheel 236 and is spaced longitudinally from the rear pair of feed wheels 236 and is offset vertically from the rear upper feed wheel 236b. The infeed conveyor 296 is disposed at a predetermined angle such as five degrees away from a horizontal plane or lower feed wheel 236a. The upper feed wheel 236c is spaced vertically from the terminal wheel end 296a of the infeed conveyor 296 to form a space or gap at a distance greater than a space or gap of the upper feed wheel 236b spaced vertically from the lower feed wheel 236a to form a generally "V" shaped configuration. It should be appreciated that the infeed conveyor 296 is conventional and known in the art.

The multiple wheel feed wheel assembly 210 includes a sprocket 248 on one end of the feed wheels 236 and terminal wheel end 296a of the infeed conveyor 296 and disposed outside of the housing 230. The multiple wheel feed wheel assembly 210 includes a lower chain 252 disposed about the sprockets 248 of the lower feed wheel 236a and terminal wheel end 296c to rotatably connect the lower feed wheel 236a and terminal wheel end 296a together. The multiple wheel feed wheel assembly 210 includes an upper chain 250 disposed about the sprockets 248 of the upper feed wheels 236b and 236c to rotatably connect the upper feed wheels 236b and 236c together. It should be appreciated that: the infeed conveyor 296 has a conveyor belt 296b, which extends over the terminal wheel end and another wheel end (not shown) and rotates therebetween. It should also be appreciated that the other end of the rear feed wheels 236a and 236b are operatively connected to the engine of the wood chipper 12 by suitable means such as the hydraulic pump (not shown) which pumps fluid to drive hydraulic motors (not shown) to rotate the rear feed wheels 236a and 236b which in turn rotate or drive the forward feed wheels 236c and terminal wheel end 296a of the infeed conveyor 296 via the chains 50 and 52. It should further be appreciated that the infeed conveyor 296 is the sole means of support for the wood material. It should still further be appreciated that wood material is placed on the infeed conveyor 296, which moves the wood material into contact with the multiple wheel feed wheel assembly 210, which, in turn, rotates and feeds the wood material into contact with the cutting assembly 18.

In operation of the wood chipper 12, wood is fed into the inlet 216 of the infeed chute assembly 214 by the infeed conveyor 296 since the terminal end 296a is driven by the rear feed wheel 236a via the chain 252. The wood is contacted by the forward feed wheel 236c and fed to the rear feed wheels 236a and 236b since the forward feed wheel 236c is driven by the rear feed wheel 236b via the chain 250. The wood is fed by the rear feed wheels 236a and 236b to the cutting assembly 18. As the cutting assembly 18 rotates and contacts the wood, the wood is cut or chipped into wood chips, which move through the outlet of the cutting assembly 18 and are expelled out of the discharge chute 22. It should be appreciated that the space between the forward upper feed wheel 236c and the infeed conveyor 296 allows larger diameter wood to be fed into the multiple wheel feed wheel assembly 210 without much effort before contacting the rear feed wheels 236a and 236b, allows the wood to be pulled out if necessary, and provides a greater longitudinal distance between the operator and the rear feed wheels 236a and 236b.

Referring to FIG. 11, still another embodiment, according to the present invention, of the multiple wheel feed wheel assembly 10 is shown. Like parts of the multiple wheel feed wheel assembly 10 has like parts increased by three hundred (300). In this embodiment, the multiple wheel feed wheel assembly 310 includes a multiple or plurality of rotatable feed wheels 336 disposed in the housing 330. In a preferred embodiment, the feed wheels 336 are two feed wheels 336a and 336b. Preferably, the feed wheels 336a and 336b are orientated horizontally to rotate about a horizontal axis. The feed wheels 336a and 336b are upper feed wheels, which are supported by the upper housing 334. The multiple wheel feed wheel assembly 310 also includes an infeed conveyor 396 extending through the inlet 316 and into the infeed chute assembly 314. The infeed conveyor 396 has a terminal wheel end 396a spaced vertically from the upper feed wheel 336a. The upper feed wheel 336a forms a rear feed wheels 336 and the upper feed wheel 336b is spaced longitudinally from the upper feed wheel 336a and vertically from the conveyor belt 396b of the infeed conveyor 396. The upper feed wheel 336b forms a forward feed wheel 336 and is spaced longitudinally from the rear feed wheel 336 and is offset vertically from the rear upper feed wheel 336a. The infeed conveyor 396 is disposed at a predetermined angle such as five degrees away from a horizontal plane. The upper feed wheel 336b is spaced vertically from the conveyor belt 396b of the infeed conveyor 396 to form a space or gap at a distance greater than a space or gap of the upper feed wheel 336a spaced vertically from the conveyor belt 396b to form a generally "V" shaped configuration. It should be appreciated that the infeed conveyor 396 is conventional and known in the art.

The multiple wheel feed wheel assembly 310 includes a sprocket 348 on one end of the feed wheels 336 and disposed outside of the housing 330. The multiple wheel feed wheel assembly 310 includes an upper chain 350 disposed about the sprockets 348 of the upper feed wheels 336a and 336b to rotatably connect the upper feed wheels 336a and 336b together. It should be appreciated that: the infeed conveyor 396 has a conveyor belt 396b, which extends over the terminal wheel end and another wheel end (not shown) and rotates therebetween. It should also be appreciated that the other end of the rear feed wheel 336a is operatively connected to the engine of the wood chipper 12 by suitable means such as the hydraulic pump (not shown) which pumps fluid to drive hydraulic motors (not shown) to rotate the rear feed wheel 336a which in turn rotates or drives the forward feed wheel 336b via the chain 350. It should further be appreciated that the conveyor belt 396b of the infeed conveyor 396 is driven by an external source such as a motor (not shown) and is the sole means of support for the wood material. It should still further be appreciated that wood material is placed on the infeed conveyor 396, which moves the wood material into contact with the multiple wheel feed wheel assembly 310, which, in turn, rotates and feeds the wood material into contact with the cutting assembly 18.

In operation of the wood chipper 12, wood is fed into the inlet 316 of the infeed chute assembly 314 by the infeed conveyor 396 since the conveyor belt 396b is driven by an external source. The wood is contacted by the forward feed wheel 336b and fed to the rear feed wheel 336a since the forward feed wheel 336b is driven by the rear feed wheel 336a via the chain 350. The wood is fed by the rear feed wheel 336a and terminal end 396a to the cutting assembly 18. As the cutting assembly 18 rotates and contacts the wood, the wood is cut or chipped into wood chips, which move through the outlet of the cutting assembly 18 and are expelled out of the discharge chute 22. It should be appreciated that the space between the forward upper feed wheel 336b and the infeed conveyor 396 allows larger diameter wood to be fed into the multiple wheel feed wheel assembly 310 without much effort before contacting the rear feed wheel 336a, allows the wood to be pulled out if necessary, and provides a greater longitudinal distance between the operator and the rear feed wheel 336a.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A wood chipper comprising:
   an infeed chute;
   a rotatable cutting assembly spaced from said infeed chute;
   a housing disposed between said infeed chute and said rotatable cutting assembly and having a stationary housing portion and a moveable housing portion slidable relative to said stationary housing portion;
   a rotatable first feed wheel operatively supported by said stationary housing portion and a rotatable second feed wheel operatively supported by said moveable housing portion, said second feed wheel being movable relative to said first feed wheel to allow wood to enter said cutting assembly; and
   at least one additional feed wheel spaced longitudinally from said first feed wheel and said second feed wheel and being operatively supported by said moveable housing portion, said at least one additional feed wheel being rotatable and movable relative to said first feed wheel, whereby wood material engaging the at least one additional feed wheel causes the at least one additional feed wheel and second feed wheel to move together away from the first feed wheel.

2. A wood chipper as set forth in claim 1 wherein said stationary housing portion comprises a stationary lower housing and said moveable housing portion comprises a movable upper housing cooperating with said lower housing.

3. A wood chipper as set forth in claim 2 wherein said first feed wheel is rotatably mounted to said lower housing and said second feed wheel is rotatably mounted to said upper housing.

4. A wood chipper as set forth in claim 3 wherein said at least one additional feed wheel comprises a third feed wheel spaced longitudinally between said second feed wheel and said infeed chute and is rotatably mounted to said upper housing.

5. A wood chipper as set forth in claim 4 wherein said at least one additional feed wheel comprises a fourth feed wheel spaced longitudinally between said first feed wheel and said infeed chute and is rotatably mounted to said lower housing.

6. A wood chipper as set forth in claim 5 wherein said second feed wheel is spaced vertically from said first feed wheel.

7. A wood chipper as set forth in claim 6 wherein said third feed wheel is spaced vertically from said fourth feed wheel.

8. A wood chipper as set forth in claim 7 wherein said first feed wheel and said second feed wheel are offset vertically from said third feed wheel and said fourth feed wheel.

9. A wood chipper as set forth in claim 7 wherein said third feed wheel and said fourth feed wheel are spaced vertically a distance greater than first feed wheel and said second feed wheel.

10. A wood chipper comprising:
    an infeed chute;
    a rotatable cutting assembly spaced from said infeed chute;
    a housing disposed between said infeed chute and said rotatable cutting assembly and having a stationary housing portion and a moveable housing portion slidable relative to said stationary housing portion;
    a rotatable first feed wheel operatively supported by said stationary housing portion and a rotatable second feed wheel operatively supported by said moveable housing portion, said second feed wheel being movable relative to said first feed wheel to allow wood to enter said cutting assembly;
    a third feed wheel spaced longitudinally from said second feed wheel and being operatively supported by said moveable housing portion, said third feed wheel being rotatable and movable relative to said first feed wheel and a rotatable fourth feed wheel spaced from said first feed wheel and being operatively supported by said stationary housing portion, whereby wood material engaging the third feed wheel causes the third feed wheel and second feed wheel to move together upwardly in a linear direction away from the first feed wheel.

11. A wood chipper as set forth in claim 10 wherein said stationary housing portion comprises a stationary lower housing and said moveable housing portion comprises a movable upper housing cooperating with said lower housing.

12. A wood chipper as set forth in claim 11 wherein said first feed wheel is rotatably mounted to said lower housing and said second feed wheel is rotatably mounted to said upper housing.

13. A wood chipper as set forth in claim 12 wherein said third feed wheel is spaced longitudinally between said second feed wheel and said infeed chute and is rotatably mounted to said upper housing.

14. A wood chipper as set forth in claim 13 wherein said fourth feed wheel is spaced longitudinally between said first feed wheel and said infeed chute and is rotatably mounted to said lower housing.

15. A wood chipper as said forth in claim 13 wherein said second feed wheel is spaced vertically from said first feed wheel and said third feed wheel is spaced vertically from said fourth feed wheel.

16. A wood chipper comprising:
    an infeed chute;
    a rotatable cutting assembly spaced from said infeed chute;

a housing disposed between said infeed chute and said rotatable cutting assembly, said housing comprising a stationary lower housing and a movable upper housing slidable relative to said lower housing;

a rotatable first feed wheel mounted to said lower housing and a rotatable second feed wheel mounted to said upper housing;

a third feed wheel spaced longitudinally from said second feed wheel and being rotatable and mounted to said upper housing, whereby wood material engaging the third feed wheel causes the upper housing to slide upwardly relative to the lower housing and the third feed wheel and second feed wheel to move upwardly and away from the first feed wheel.

17. A wood chipper comprising:

an infeed chute;

a rotatable cutting assembly spaced from said infeed chute;

a housing disposed between said infeed chute and said rotatable cutting assembly, said housing comprising a stationary lower housing and a movable upper housing slidable relative to said lower housing;

a rotatable first feed wheel mounted to said upper housing between said infeed chute and said cutting assembly;

a rotatable second feed wheel spaced longitudinally between said first feed wheel and said infeed chute and mounted to said upper housing; and a conveyor having a terminal wheel end extending through said infeed chute and being spaced vertically from either one of said first feed wheel and said second feed wheel to feed wood material to said second feed wheel, whereby wood material engaging the second feed wheel causes the upper housing to slide upwardly relative to the lower housing and the second feed wheel and the first feed wheel to move upwardly and away from the conveyor.

* * * * *